United States Patent
Martinsson et al.

(10) Patent No.: US 11,015,760 B2
(45) Date of Patent: *May 25, 2021

(54) THROTTLE LOCKOUT WITH DISSIMILAR ACTION

(71) Applicant: HUSQVARNA AB, Huskvarna (SE)

(72) Inventors: Pär Martinsson, Jönköping (SE); Mia Herou, Bankeryd (SE); Mikael Arvidsson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,018

(22) Filed: Feb. 13, 2020

(65) Prior Publication Data

US 2020/0182402 A1 Jun. 11, 2020

Related U.S. Application Data

(63) Continuation of application No. 15/308,440, filed as application No. PCT/EP2015/059911 on May 6, 2015, now Pat. No. 10,605,406.

(30) Foreign Application Priority Data

May 7, 2014 (WO) ................ PCT/EP2014/059311

(51) Int. Cl.
*F16P 3/00* (2006.01)
*B25F 5/00* (2006.01)
*B27B 17/00* (2006.01)

(52) U.S. Cl.
CPC ........ *F16P 3/00* (2013.01); *B25F 5/00* (2013.01); *B27B 17/00* (2013.01)

(58) Field of Classification Search
CPC ....... B27B 17/083; B25D 16/00; B25D 11/00; B25F 5/00

(Continued)

(56) References Cited

U.S. PATENT DOCUMENTS 6,842,987 B1   1/2005  Martinsson et al.
6,878,888 B1   4/2005  Jong
              (Continued)

FOREIGN PATENT DOCUMENTS

CN   101802380 A   8/2010
CN   202194729 U   4/2012
              (Continued)

OTHER PUBLICATIONS

International Search Report and Written Opinion for International Application No. PCT/EP2015/059911 dated Aug. 3, 2015.

(Continued)

*Primary Examiner* — Anna K Kinsaul
*Assistant Examiner* — Veronica Martin
(74) *Attorney, Agent, or Firm* — Burr & Forman, LLP

(57) ABSTRACT

A hand-held power tool (100) may include an electric power source (110), an electric motor (120) selectively coupled to the electric power source (110), a working assembly (130) operably coupled to the electric motor (120) to perform a working function responsive to actuation of the electric motor (120), and a control assembly (140) operably coupled to the electric motor (120) to provide selective control over actuation of the electric motor (120). The control assembly (140) may be configured to provide the selective control based on performance of at least two dissimilar operator actions. The control assembly (140) may include a sensing member (210) and a throttle control member (200). The sensing member (210) may be configured to be operable to an actuated state responsive to an enabling action comprising a first of the two dissimilar operator actions. The throttle control member (200) may be configured to be repeatedly operable responsive to actuation of the throttle control member (200) while the sensing member (210) is in the actuated state. Actuation of the throttle control member (Continued)

(200) may include a second of the two dissimilar operator actions.

20 Claims, 8 Drawing Sheets

(58) Field of Classification Search
USPC ......... 173/2, 4, 11, 20, 48, 117, 217; 30/381
See application file for complete search history.

(56) References Cited

U.S. PATENT DOCUMENTS

| | | | |
|---|---|---|---|
| 7,866,048 B2 | 1/2011 | Kodama et al. | |
| 8,333,174 B2 | 12/2012 | Carlsson et al. | |
| 2002/0185514 A1 | 12/2002 | Adams et al. | |
| 2003/0088987 A1* | 5/2003 | Jong | B27B 17/10 30/381 |
| 2003/0089575 A1 | 5/2003 | Jong | |
| 2005/0218176 A1 | 10/2005 | Schell et al. | |
| 2010/0218966 A1 | 9/2010 | Liebhard et al. | |
| 2011/0147021 A1* | 6/2011 | Schaal | B25F 5/001 173/47 |
| 2012/0023761 A1 | 2/2012 | Martinsson et al. | |
| 2012/0048584 A1 | 3/2012 | Sato | |
| 2014/0174772 A1 | 6/2014 | Mandalka et al. | |
| 2014/0190713 A1* | 7/2014 | Martinsson | A01G 3/06 173/20 |
| 2015/0283631 A1 | 10/2015 | Seki | |

FOREIGN PATENT DOCUMENTS

| | | |
|---|---|---|
| CN | 202952234 U | 5/2013 |
| CN | 103747922 A | 4/2014 |
| WO | 2013/032374 A1 | 3/2013 |

OTHER PUBLICATIONS

International Search Report and Written Opinion for International Application No. PCT/EP2014/059311 dated Jan. 28, 2015.

\* cited by examiner

THROTTLE LOCKOUT WITH DISSIMILAR ACTION

CROSS-REFERENCE TO RELATED APPLICATIONS

The present application is a continuation of U.S. patent application Ser. No. 15/308,440 filed on Nov. 2, 2016, which is a continuation of International Application number PCT/EP2015/059911 filed on May 6, 2015 which claims priority to International Application Number PCT/EP2014/059311, filed on May 7, 2014 and is expressly incorporated by reference in its entirety.

TECHNICAL FIELD

Example embodiments generally relate to hand held power equipment and, more particularly, relate to a throttle lockout feature that is initially operable with a dissimilar action, but repeatedly enables the throttle to be actuated while the lockout is maintained in an actuated state thereafter.

BACKGROUND

Outdoor power equipment includes such devices as mowers, trimmers, edgers, chainsaws, blowers and the like. These devices are often used to perform tasks that inherently require the devices to be mobile. Accordingly, these devices are typically made to be relatively robust and capable of handling difficult work in hostile environments, while balancing the requirement for mobility.

Powering such devices could be accomplished in any number of ways. However, for outdoor power equipment that is intended to be mobile, and for which the emissions (i.e., in terms of noise and/or pollutants) generated by the device may also become an important consideration, electric motors are often popular choices to power such devices.

Electric motors may be powered from a battery or corded connection to mains power. In any case, using electric motors to power equipment may provide certain advantages in terms of enabling various electronic control features to be employed, and in terms of having near instantaneous response of such devices when the throttle mechanism is actuated. Given that the response time for such devices can be pretty low, and that the working assemblies of some devices could cause injury if they are not employed with care, it is often desirable to employ safety mechanisms or interlocks to ensure that inadvertent actuation of the working assembly is inhibited. One such common safety mechanism is a throttle lockout mechanism.

The throttle lockout mechanism is often provided on the handle portion of a device and must be pressed or actuated in order to permit the trigger or throttle control mechanism to be actuated. The idea is that if the throttle lockout mechanism is actuated, the operator is exhibiting positive control of the handle, so the trigger can be pressed to engage the working assembly. However, it may be possible for the operator to grasp the handle and in one motion (i.e., the grasping motion) compress both the throttle lockout mechanism and the throttle control mechanism at nearly the same time, thereby inadvertently engaging the working assembly. Thus, it may be desirable to address this issue.

BRIEF SUMMARY OF SOME EXAMPLES

Some example embodiments may provide for the inclusion of a requirement for a dissimilar action to be employed in order to actuate the throttle lockout mechanism. Thus, the throttle lockout mechanism and trigger should not be able to be inadvertently actuated nearly simultaneously. However, the dissimilar action may only be required initially rather than each time the trigger is cycled between off and on positions.

In one example embodiment, a hand-held power tool is provided. The hand-held power tool may include an electric power source, an electric motor selectively coupled to the electric power source, a working assembly operably coupled to the electric motor to perform a working function responsive to actuation of the electric motor, and a control assembly operably coupled to the electric motor to provide selective control over actuation of the electric motor. The control assembly may be configured to provide the selective control based on performance of at least two dissimilar operator actions. The control assembly may include a sensing member and a throttle control member. The sensing member may be configured to be operable to an actuated state responsive to an enabling action comprising a first of the two dissimilar operator actions. The throttle control member may be configured to be repeatedly operable responsive to actuation of the throttle control member while the sensing member is in the actuated state. Actuation of the throttle control member may include a second of the two dissimilar operator actions.

In another example embodiment, a control assembly for selectively controlling actuation of an electric motor that powers a working assembly of a hand-held power tool is provided. The control assembly may be configured to provide the selective control based on performance of at least two dissimilar operator actions. The control assembly may include a sensing member configured to be operable to an actuated state responsive to an enabling action comprising a first of the two dissimilar operator actions, and a throttle control member. The throttle control member may be configured to be repeatedly operable responsive to actuation of the throttle control member while the sensing member may be in the actuated state. The actuation of the throttle control member may include a second of the two dissimilar operator actions.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
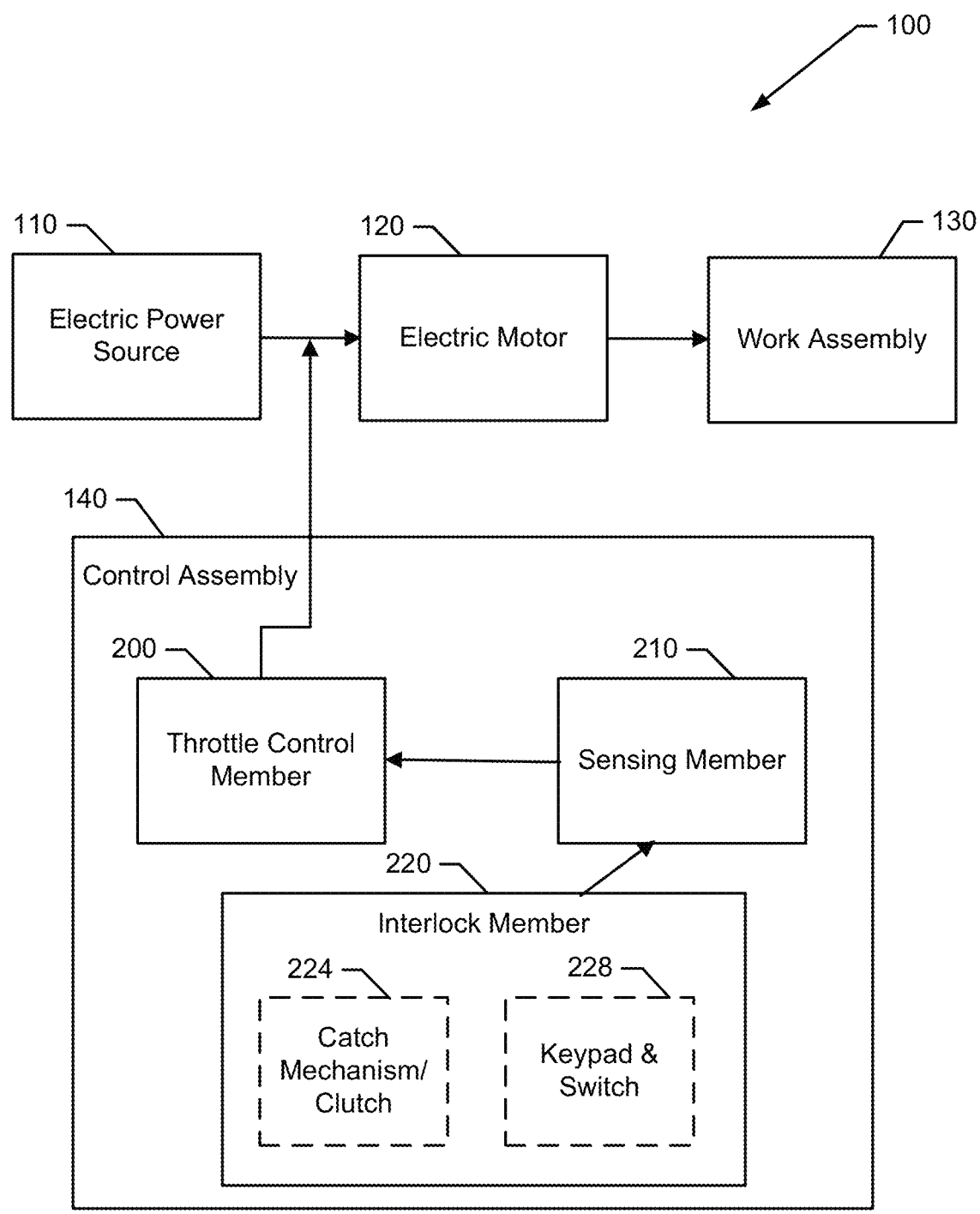
FIG. 1 illustrates a block diagram of a hand-held power tool according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, it may be possible for the operator to grasp the handle and in one motion (i.e., the grasping motion) compress both the throttle lockout mechanism and the throttle control mechanism at nearly the same time, thereby inadvertently engaging the working assembly. One way to address this problem may be to provide a separate button elsewhere on the device to require the operator to actuate the separate button to enable the throttle lockout to be depressed in connection with actuation of the separate button in order to allow the throttle trigger to be actuated. However, with such an embodiment, the releasing of the throttle trigger may necessitate that the separate button and throttle lockout be again simultaneously actuated to enable the throttle trigger to be actuated again. This can be cumbersome for the operator to repeatedly go back to actuate the separate button each time the throttle trigger is to be cycled.

To prevent this cumbersome and repetitive process from being necessary, some example embodiments may provide for a hand-held power tool (e.g., a chainsaw, blower, edger, trimmer, etc.) that can be provided with a throttle lockout mechanism that is enabled initially at least via a dissimilar action, but can be maintained thereafter as long as the throttle lockout mechanism remains in an actuated state. After initial enabling of the ability to shift the throttle lockout mechanism to the actuated state with the dissimilar action (i.e., an enabling action), the trigger (or throttle control mechanism) may be repeatedly cycled without requiring the operator to undertake (or repeat) the dissimilar action in advance of each cycle.

FIG. 1 illustrates a block diagram of a hand-held power tool 100 according to an example embodiment. As shown in FIG. 1, the tool 100 may include an electric power source 110 that powers an electric motor 120. The electric power source 110 could be a battery or mains power. The electric motor 120 may rotate to operate a working assembly 130 to perform a functional task. In some cases, the working assembly 130 may be a blade, chain, auger, or other rotating assembly or device cable of cutting material when engaged. However, in some cases, the working assembly 130 could be a fan or other such rotating equipment that is used to move air or other fluid media. The electric motor 120 may operate under the control of a control assembly 140 that may control the application of power to actuate the electric motor 120.

In some embodiments, the control assembly 140 may include a throttle control member 200, which may be embodied as a trigger, lever, activation button or other such member that is configured to cause the electric motor 120 to turn when actuated. The throttle control member 200 may be inhibited from operation unless a sensing member 210 (e.g., a throttle lockout member) is in an actuated state. However, in accordance with an example embodiment, the sensing member 210 may not be enabled to shift to the actuated state until a dissimilar action (i.e., an enabling action) is performed. The dissimilar action must be dissimilar from the grasping motion that could actuate the throttle control member 200 and sensing member 210 at the same time.

Accordingly, for example, the control assembly 140 may be configured to provide selective control over the electric motor 120 based on performance of at least two dissimilar operator actions. In some cases, the sensing member 210 may be configured to be operable to an actuated state responsive to an enabling action. The enabling action may constitute a first of the two dissimilar operator actions. In the actuated state of the sensing member 210, the electric motor 120 may be powered. Meanwhile, the throttle control member 200 may be configured to be repeatedly operable responsive to actuation (i.e., compression) of the throttle control member 200 while the sensing member 210 is in the actuated state. Accordingly, for example, if the sensing member 210 is compressed or otherwise shifted to an actuated state (e.g., electronically), the throttle control member 200 may be enabled to be actuated. Actuation of the throttle control member 200 may constitute a second of the two dissimilar operator actions.

In an example embodiment, the control assembly 140 may further include an interlock assembly 220 that may be used to provide a mechanism by which to perform the enabling action. In this regard, for example, the interlock assembly 220 may be operably coupled to the sensing member 210 to prevent actuation of the sensing member 210 until the enabling action is performed. The prevention of actuation of the sensing member 210 may be accomplished via mechanical or electrical means.

FIG. 1 illustrates examples of mechanical and electrical solutions by which to allow the operator to perform the enabling action in alternative example embodiments. Accordingly, since the alternative solutions are shown together, they are provided in dashed lines in FIG. 1. As a mechanical alternative, a catch mechanism/clutch 224 (e.g., a physical assembly to mechanically prevent the operator from shifting the sensing member 210 to the actuated state prior to performance of the enabling action) may be provided. As an electrical alternative, a keypad and switch 228 may be provided to electrically (and perhaps also mechanically) prevent the operator from shifting the sensing member 210 to the actuated state until the enabling action is performed. Thus, for example, the interlock assembly 220 may provide components for receiving the enabling action and for preventing actuation of the sensing member 210 (or shifting/maintaining of the sensing member 210 to/in the actuated state) until the enabling action is performed. In an example embodiment, the interlock assembly 220 may enable the sensing member 210 to be held by the operator in the actuated state. The throttle control member 200 may therefore be releasable and can be re-actuated any number of times while the sensing member 210 is in the actuated state without subsequent performance of the enabling action.

In other words, the throttle control member 200 may not be able to be actuated unless the sensing member 210 is in the actuated state, and shifting of the sensing member 210 to the actuated state may require performance of the enabling action. However, while the sensing member 210 is in the actuated state, the throttle control member 200 may be actuated (e.g., compressed) any number of times without requiring the enabling action to be repeated. Thus, the enabling action can be performed one time and, as long as the sensing member 210 remains in the actuated state, numerous cycling operations of the throttle control member 200 may be repeated. However, if the sensing member 210 is released (e.g., to a non-actuated state), then the enabling action will need to be repeated and the sensing member 210 will need to be shifted to the actuated state again before the throttle control member 200 can again be actuated.

Figure 2:
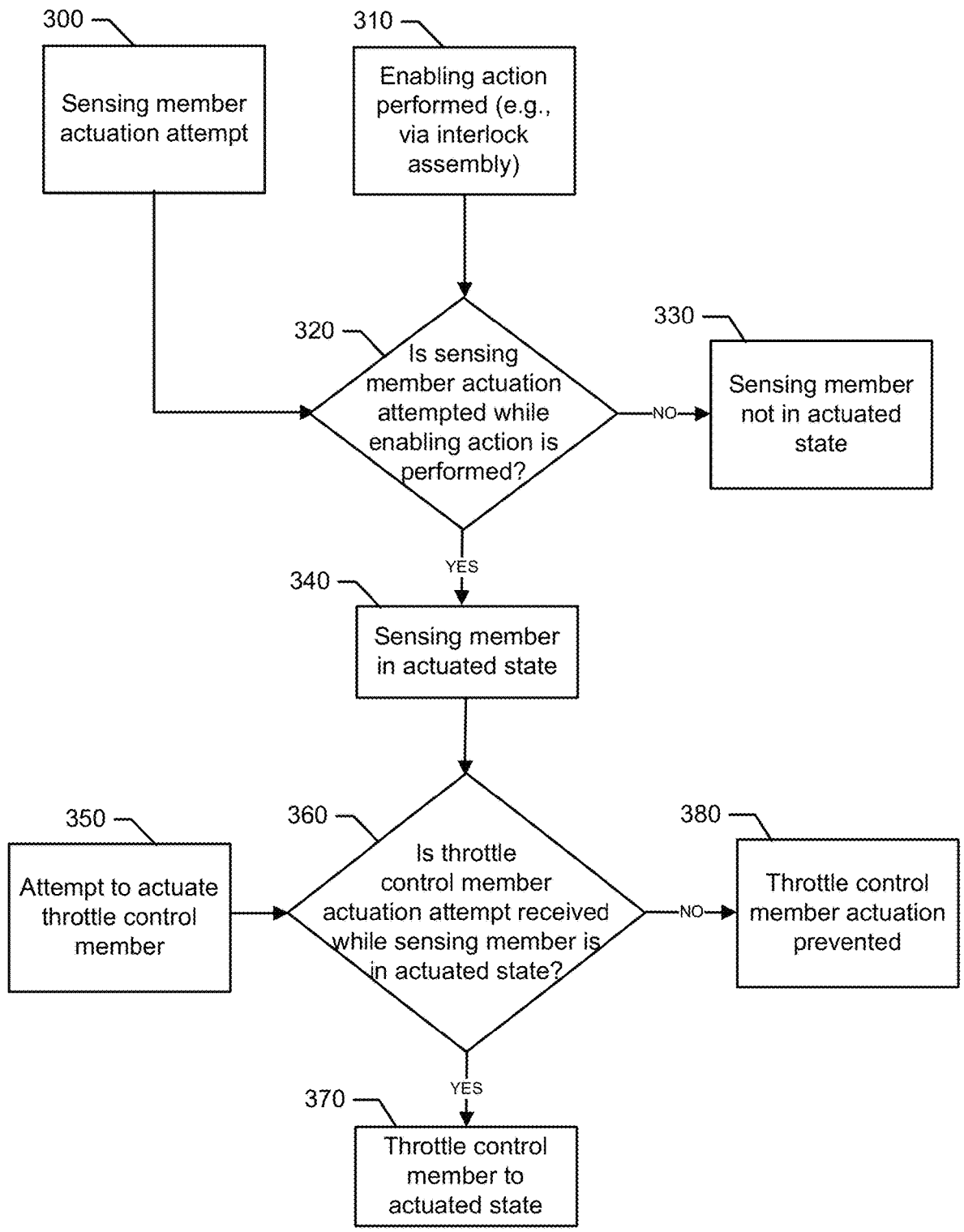
FIG. 2 illustrates a control flow diagram of various operations in accordance with an example embodiment.

FIG. 2 illustrates a control flow diagram in accordance with an example embodiment. As shown in FIG. 2, detection of performance of sensing member actuation (e.g., compression of the throttle lockout member) may be performed at operation 300. Detection of the performance of an enabling action may also be detected at operation 310. At operation 320, a determination may be made as to whether sensing member actuation is attempted while the enabling action is performed. If both are not performed (i.e., at an overlapping or same time), then the sensing member is not shifted to the actuated state at operation 330. However, if both sensing member actuation and enabling action are performed at the same time, then the sensing member is shifted to the actuated state at operation 340. Thus, performance of operation 300 or 310 independent of each other cannot shift the sensing member to the actuated state.

An attempt to actuate the throttle control member may be received at any time at operation 350. When the attempt is received, a determination may be made as to whether the attempt to actuate the throttle control member is received while the sensing member is in the actuated state at operation 360. If the throttle control member actuation attempt is received while the sensing member is in the actuated state, the throttle control member may be actuated (e.g., thereby operating the electric motor 120 to turn the working assembly 130) at operation 370. However, if the throttle control member actuation attempt is received while the sensing member is not in the actuated state, throttle control member actuation may be prevented at operation 380.

Figure 3:
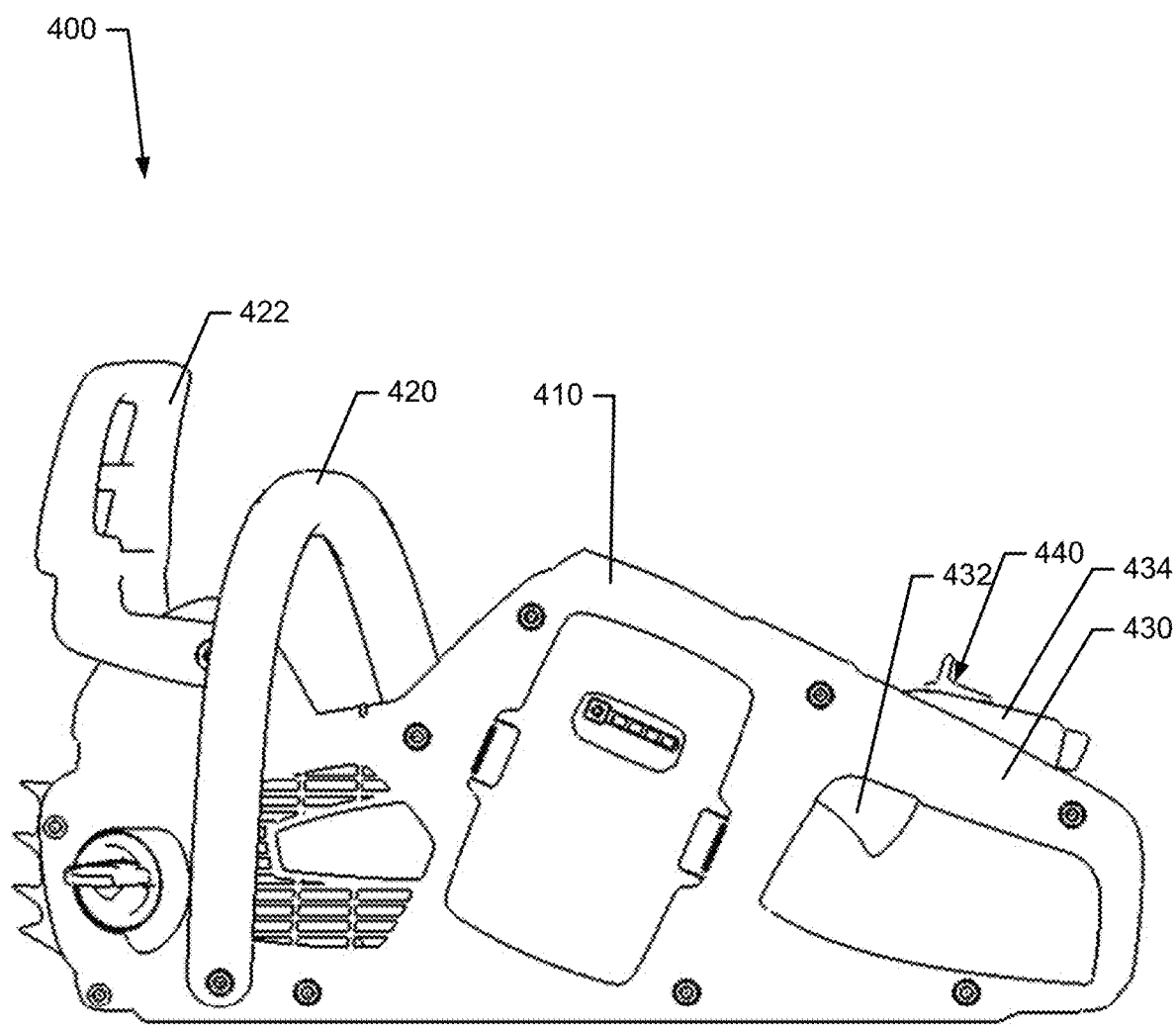
FIG. 3 illustrates a side view of a chainsaw as an example of a power tool according to an example embodiment.

FIG. 3 illustrates a side view of a chainsaw 400 according to an example embodiment. It should be appreciated that the chainsaw 400 is merely one example of a hand held power tool 100 that includes a working assembly 130 (i.e., the cutting components of the chainsaw 400) that may require or otherwise benefit from employing an example embodiment. Thus, example embodiments could also be practiced in connection with some other power equipment that may include working assemblies of different types.

As shown in FIG. 1, the chainsaw 400 may include a housing 410 inside which a power unit or electric motor (not shown) is housed. The chainsaw 400 may further include a guide bar (not shown) that is attached to the housing 410 along one side thereof to permit a chain (not shown) to be driven around the guide bar responsive to operation of the power unit in order to enable the chainsaw 400 to cut lumber or other materials. The guide bar and the chain may form the working assembly of the chainsaw 400.

The chainsaw 400 may include a front handle 420 and a rear handle 430. A chain brake and front hand guard 422 may be positioned forward of the front handle 420 to stop the movement of the chain in the event of a kickback. In an example embodiment, the hand guard 422 may be tripped by rotating forward in response to contact with a portion of the arm (e.g., the hand/wrist) of the operator of the chainsaw 400. In some cases, the hand guard 422 may also be tripped in response to detection of inertial measurements indicative of a kickback.

The rear handle 430 may include a trigger 432 to facilitate operation of the power unit when the trigger 432 is actuated. In this regard, for example, when the trigger 432 is actuated (e.g., depressed), the rotating forces generated by the power unit may be coupled to the chain. The term "trigger," as used herein, should be understood to represent any actuator that is capable of being operated by a hand or finger of the user. Thus, the trigger 432 may represent a button, switch, or other such component that can be actuated by a hand or portion thereof, and the trigger 432 serves as an example of the throttle control member 200 of FIG. 1.

The rear handle 430 may also include a throttle lockout member 434, which may be an example of the sensing member 210 of FIG. 1. The throttle lockout member 434 may be depressed (or actuated) to enable the trigger 432 to be actuated. However, the throttle lockout member 434 of this example may also employ a catch 440 that provides an example of the interlock assembly 220 of FIG. 1. As can be appreciated from the description above, actuation of the catch 440 may act as the enabling action to allow the throttle lockout member 434 to be depressed. After the throttle lockout member 434 is depressed, the trigger 432 may be depressed. Moreover, although the enabling action must be provided to initially depress the throttle lockout member 434, the trigger 432 may be cycled between depressed and released states any number of times as long as the throttle lockout member 434 remains depressed and therefore in the actuated state.

Figure 4:
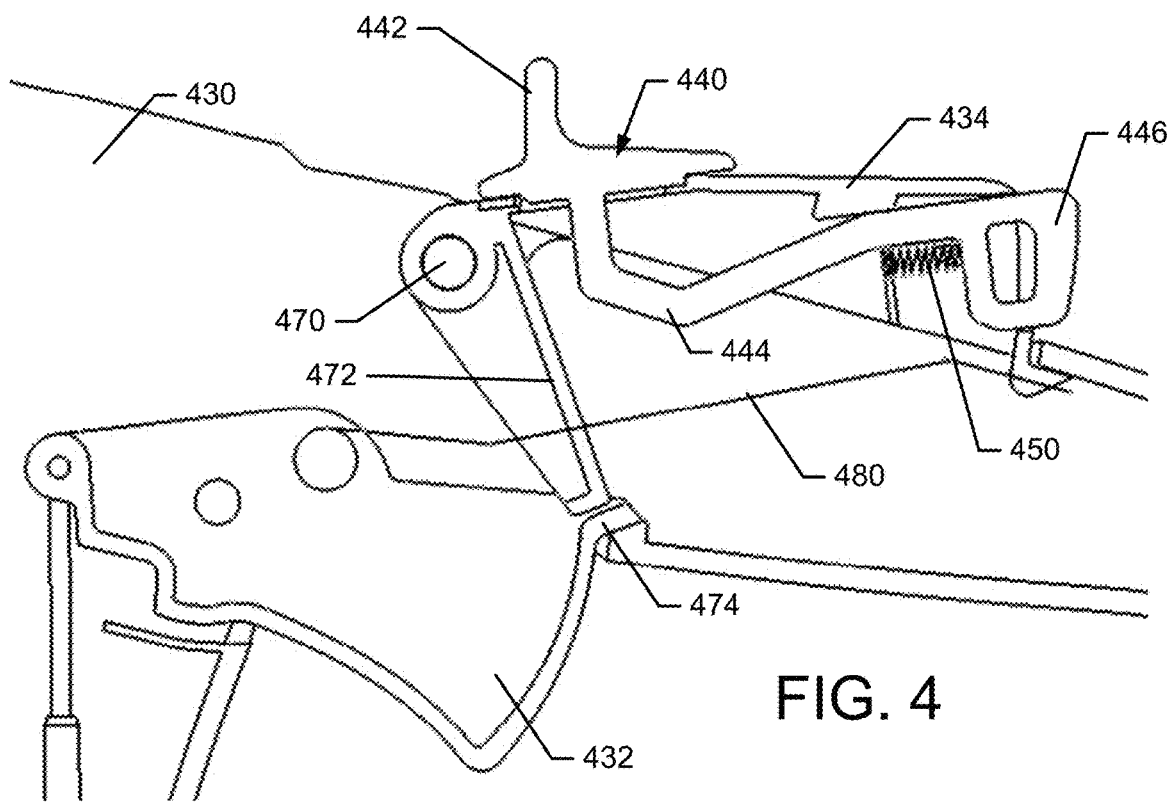
FIG. 4 shows an interlock member in the form of a catch member prior to an enabling action being performed according to an example embodiment.
Figure 5:
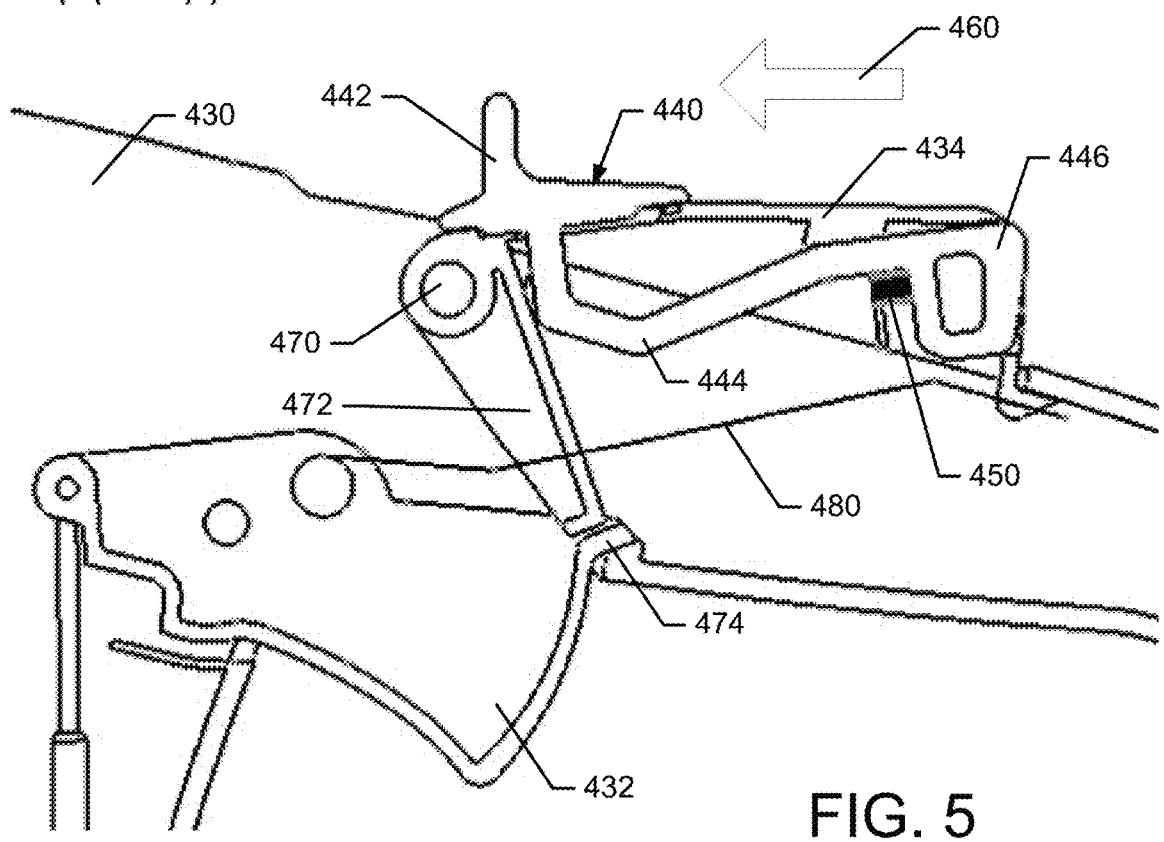
FIG. 5 illustrates the catch after the enabling action has been performed according to an example embodiment.
Figure 6:
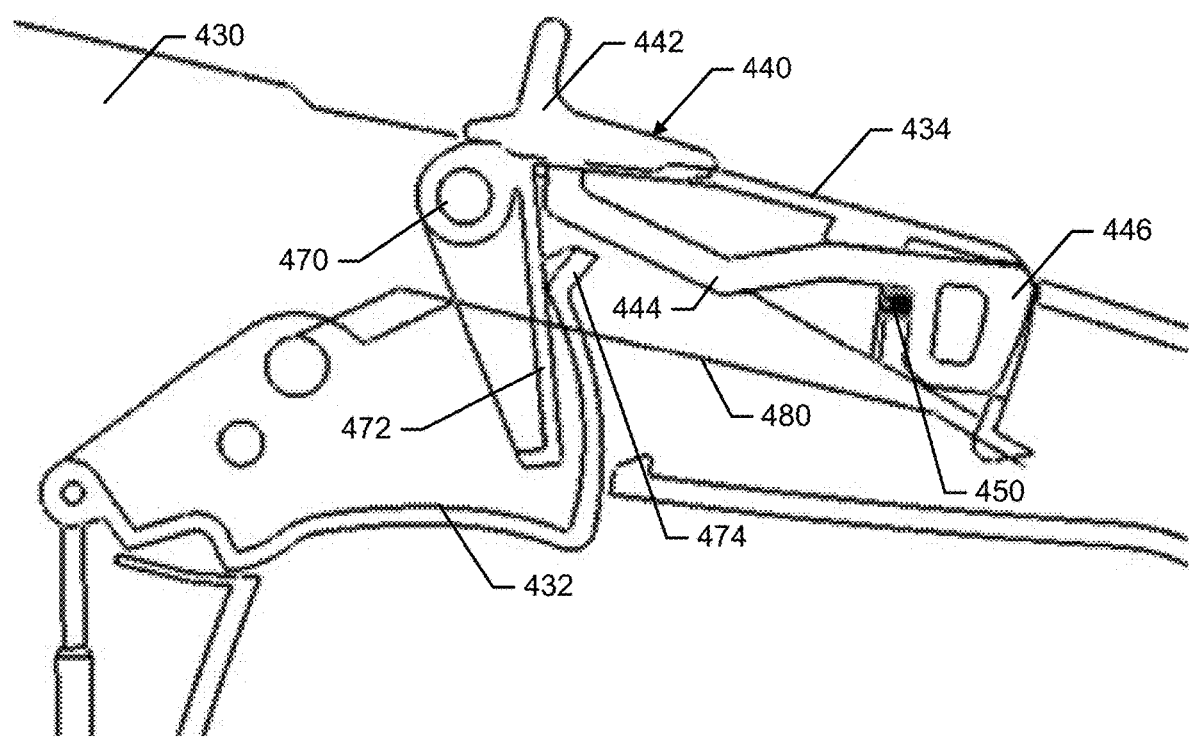
FIG. 6 illustrates a throttle lockout member after the enabling action has been performed and the throttle lockout member is in the actuated state according to an example embodiment.

FIGS. 4-6 illustrate partially cutaway views of the rear handle 430 to show various components in different conditions during a sequence of operations according to an example embodiment. In this regard, FIG. 4 shows a structure that could be an example of the catch mechanism/clutch 224 of FIG. 1 (i.e., representing an example of a mechanical structure for embodying the interlock member 220). As shown in FIGS. 4-6, the throttle lockout member 434 may be on a top side of the rear handle 430 and the trigger 432 may be on the opposite side of the rear handle 430 (i.e., on the bottom). As can be appreciated from FIGS. 4-6, a single action such as grasping the rear handle 430 could actuate both the throttle lockout member 434 and the trigger 432. Thus, the catch 440 is provided to ensure that a dissimilar action (i.e., an enabling action) is required to be provided by the operator to unlock the throttle lockout member 434.

FIG. 4 shows the catch 440 prior to the enabling action being performed. FIG. 5 illustrates the catch 440 after the enabling action has been performed. FIG. 6 illustrates the throttle lockout member 434 after the enabling action has been performed and the throttle lockout member 434 is in the actuated state. As shown in FIGS. 4-6, the catch 440 may include an operative member 442, a connecting portion 444 and a blocking portion 446. The operative member 442 may be a slidable member that can be slid forward to actuate the catch 440 or move the catch 440 to initiate the enabling action (i.e., pushing the operative member 442 and thereby the entire catch 440 forward with the thumb or another finger of the operator). The connecting portion 444 may be an elongate member that may connect the operative member 442 to the blocking portion 446. Meanwhile, the blocking portion 446 may extend from a portion of the throttle lockout member 434 to prevent movement of the throttle lockout member 434 to the actuated state unless the catch 440 is actuated (i.e., when the operative member 442 is pushed forward).

A biasing element (e.g., spring 450) may be provided to bias the blocking portion 446 to be extended out of a rear end of the throttle lockout member 434. Thus, other than at times when the operator presses the operative member 442 forward to execute the enabling action, the spring 450 may bias the blocking portion 446 to prevent the throttle lockout member 434 from being depressed. When the operative member 442 is pressed in the direction shown by arrow 460 (i.e., forward), the entire catch 440 moves in the direction of arrow 460 so that the blocking portion 446 is essentially withdrawn into the throttle lockout member 434 so that downward movement to actuate the throttle lockout member 434 is not inhibited as shown in FIG. 5. The spring 450 is compressed to return the blocking portion 446 to its rest position as soon as the operator releases the operative member 442.

From the position of FIG. 5, the operator may depress or actuate the throttle lockout member 434 to transition the throttle lockout member 434 to the actuated state as shown in FIG. 6. While in this state, the trigger 432 may be cycled repeatedly on and off and there is no need to repeat the enabling action as long as the throttle lockout member 434 is maintained in the actuated state. However, if the throttle lockout member 434 is released, the blocking portion 446 will extend rearward and resume blocking of any subsequent compression of the throttle lockout member 434 unless the enabling action (i.e., forward movement of the operative member 442) is also executed.

Referring to FIGS. 5 and 6, compression of the throttle lockout member 434 may cause rotation of the throttle lockout member 434 about a pivot point 470 so that a pivot member 472 rotates forward to allow the trigger 432 to also be compressed as shown in FIG. 6. When the pivot member 472 is in the position shown in FIG. 5, the trigger 432 cannot be compressed as the pivot member 472 blocks a lockout interface portion 474 from moving upward. However, when the pivot member 472 rotates to the position of FIG. 6 responsive to actuation of the throttle lockout member 434, the lockout interface portion 474 is clear to move past the pivot member 472 to enable the trigger 432 to be actuated.

Of note, when the operator releases pressure on the throttle lockout member 434, a lockout biasing member (e.g., spring 480) may return the throttle lockout member 434 to its rest position (i.e., not compressed or actuated). In some cases, the spring 480 may also return the trigger 432 to its rest position when the trigger 432 is not being compressed by the operator.

Figure 7:
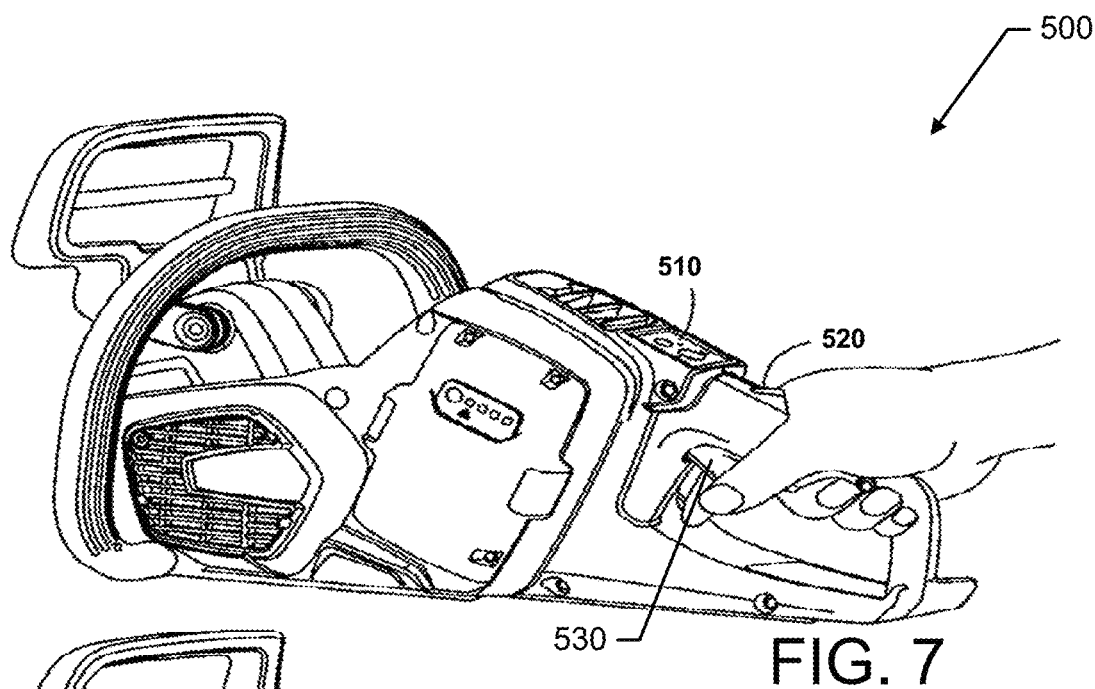
FIG. 7 illustrates a side view of an alternative structure of a chainsaw in accordance with an example embodiment.
Figure 8:
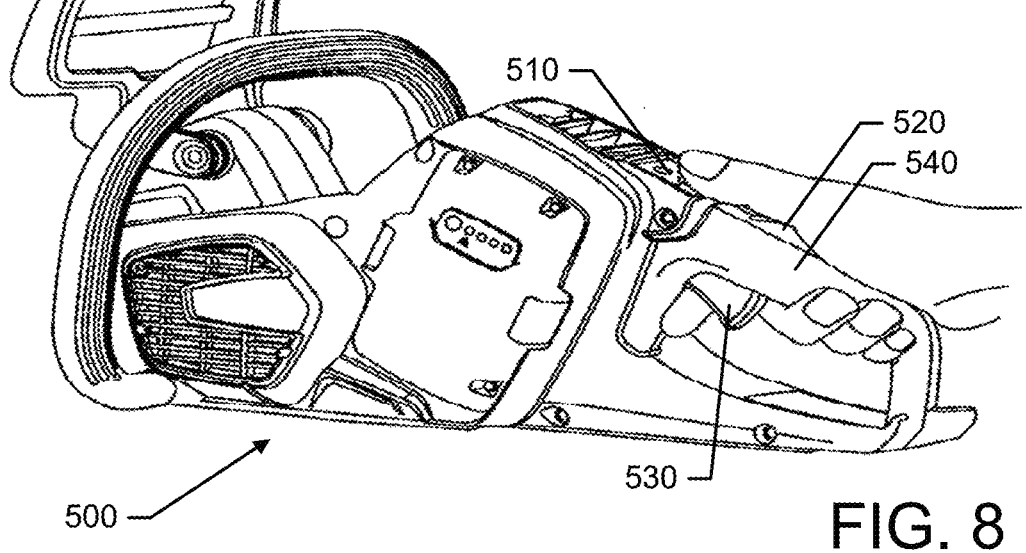
FIG. 8 illustrates the chainsaw while an enabling action is performed in accordance with an example embodiment.

As mentioned above, the interlock assembly 220 could alternatively be provided via electronic means. FIGS. 7-10 illustrate examples in which the keypad and switch 228 described in reference to FIG. 1 may be embodied in a chainsaw as one example of the tool 100. FIGS. 7 and 8 illustrate a chainsaw 500 having a keypad 510 via which the dissimilar action (i.e., the enabling action) can be provided. In this regard, for example, the operator in FIG. 7 performs one action (i.e., compressing a throttle lockout member 520). Meanwhile, in FIG. 8, the operator reaches with the thumb to perform a dissimilar and enabling action of actuating a key on the keypad 510 to unlock the throttle lockout member 520. In some cases, the physical position of the throttle lockout member 520 may be allowed to move to a compressed state whether or not the enabling action is performed. However, the throttle lockout member 520 may not be permitted to transition to the actuated state until both the throttle lockout member 520 is compressed and the enabling action is performed. In other cases, the throttle lockout member 520 may be physically inhibited from movement as well.

As mentioned above, similar to the example described in reference to FIGS. 4-6, when the throttle lockout member 520 is in the actuated state, the actuation of the trigger 530 may be repeatedly cycled without repeating the enabling action. An operator holding the rear handle 540 may therefore only perform the enabling action one time and, as long as the throttle lockout member 520 remains compressed thereafter, can repeatedly cycle the trigger 530.

Figure 9:
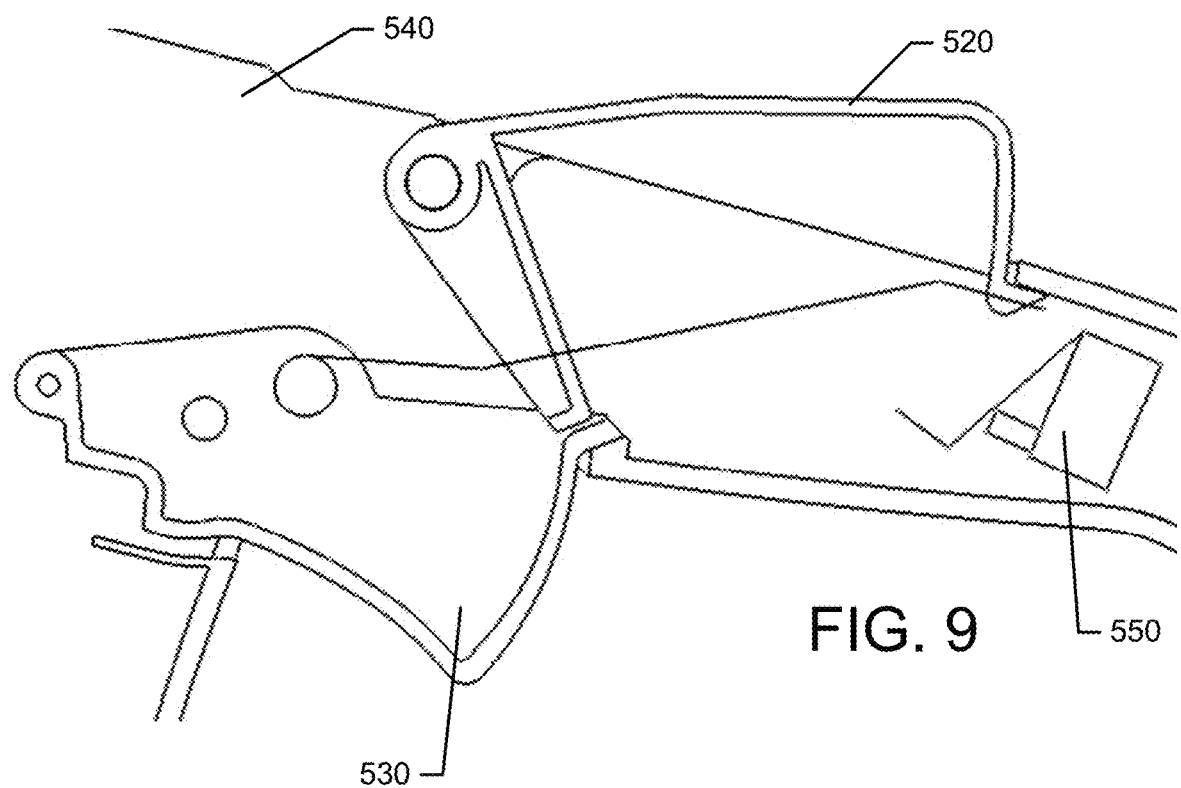
FIG. 9 illustrates an interlock member incorporating a keypad and switch in a non-actuated state of the throttle lockout member in accordance with an example embodiment.
Figure 10:
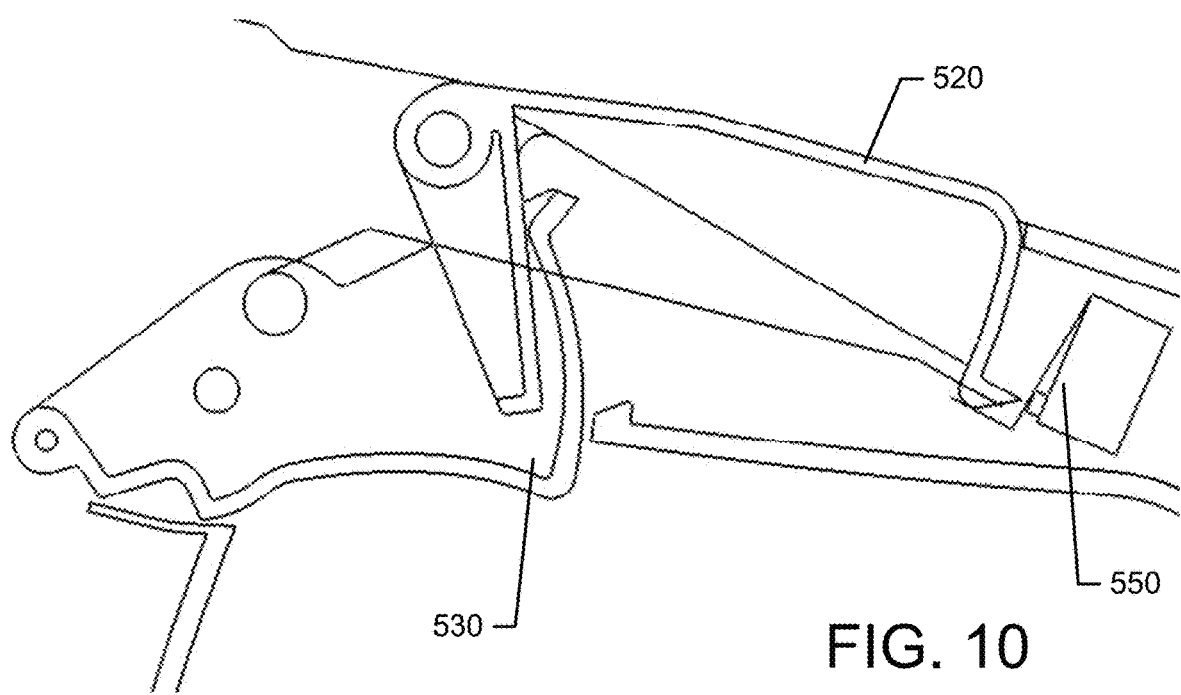
FIG. 10 illustrates an interlock member incorporating a keypad and switch in an actuated state of the throttle lockout member in accordance with an example embodiment.

Whether the throttle lockout member 520 is compressed or not may be determinable via a switch 550 that may be provided in the handle 540. When the throttle lockout member 520 is not compressed as shown in FIG. 9, the switch 550 is open and a controller or other processing circuitry operably coupled to the keypad 510 to implement functionality of the interlock member 220 based on the operation of the keypad 510 and throttle lockout member 520 may be configured to indicate the throttle lockout member 520 as being in a not-actuated condition or state. However, if the keypad 510 has been actuated to initiate the enabling action, when the throttle lockout member 520 is compressed as shown in FIG. 10, the switch 550 is closed and the controller indicates that the throttle lockout member 520 is in the actuated state. The trigger 530 may then be repeatedly actuated (e.g., cycled on and off) as long as the controller indicates that the throttle lockout member 520 is in the actuated state.

Of note, in some embodiments, the controller may be configured to interface with the keypad 510 and/or the throttle lockout member 520 in a manner that only considers physical positions of components at the present time. For example, the enabling action may need to be performed on the keypad 510 while the throttle lockout member 520 is compressed to switch the throttle lockout member 520 to the actuated state. However, in other embodiments, the controller may be configured to integrate timing considerations. For example, after the enabling action is performed on the keypad 510, a timer may pass timing information to the controller. The controller may allow the compression of the throttle lockout member 520 within a predetermined time after performance of the enabling action to shift the throttle lockout member 520 to the actuated state. Timing limitations may also be implemented, if desired, relative to switch activation and/or trigger activation in various ways in various embodiments.

Although the embodiments described above provide specific example structures for the provision of certain features, it should be appreciated that such features could also be provided with different structures in some cases. As an example, the structures of FIGS. 4 and 5 may be slightly modified in form, but may operate substantially the same from a functional perspective. An example of a slightly modified structure is provided in the examples of FIGS. 11 and 12.

Figure 11:
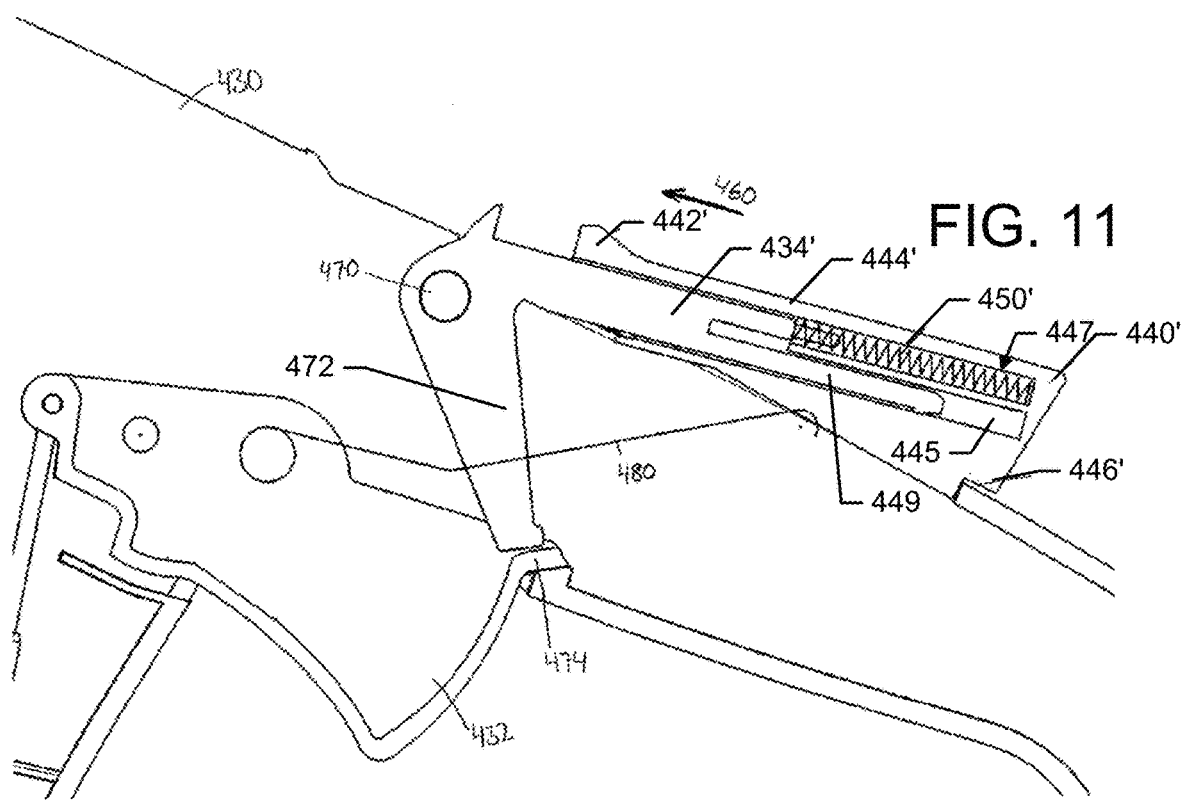
FIG. 11 shows an alternative interlock member structure with the catch member prior to an enabling action being performed according to an example embodiment.
Figure 12:
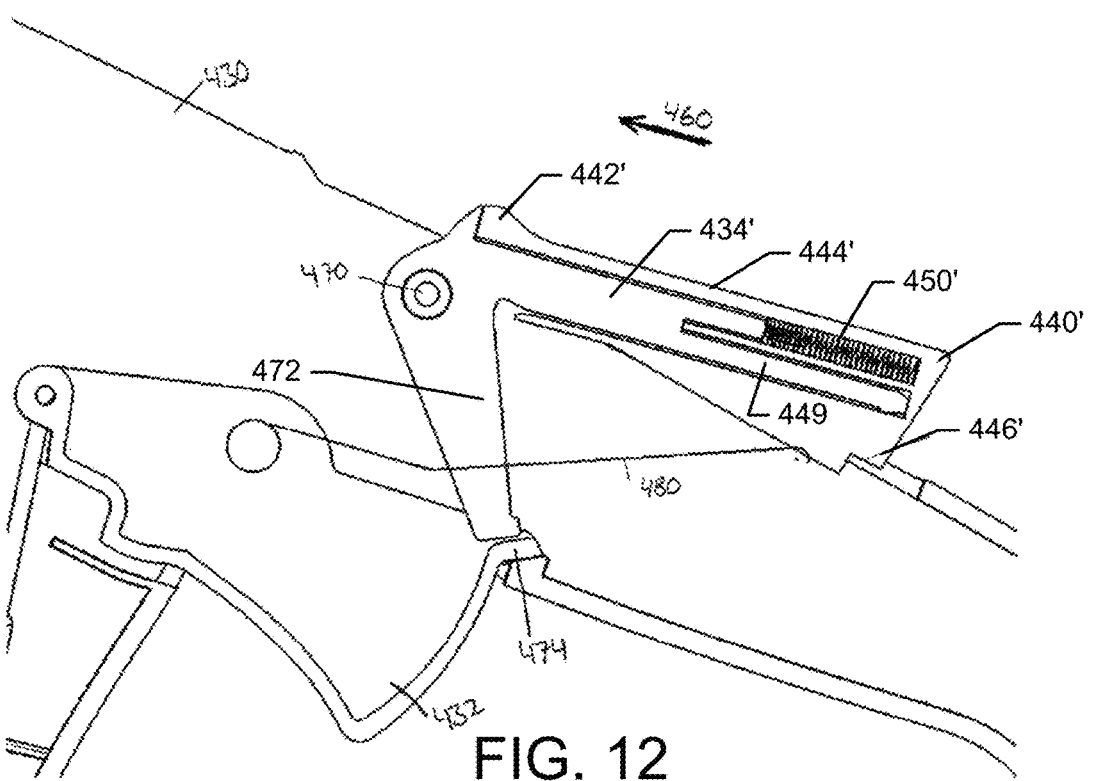
FIG. 12 illustrates the catch after the enabling action has been performed according to an example embodiment.

FIGS. 11 and 12 illustrate partially cutaway views of the rear handle 430 to show various components in different conditions during a sequence of operations according to another example embodiment. In this regard, FIG. 11 shows another structure that could be an example of the catch mechanism/clutch 224 of FIG. 1 (i.e., representing an example of a mechanical structure for embodying the interlock member 220). As shown in FIGS. 11 and 12, the throttle lockout member 434' may be on a top side of the rear handle 430 and the trigger 432 may be on the opposite side of the rear handle 430 (i.e., on the bottom). As can be appreciated from FIGS. 11 and 12, a single action such as grasping the rear handle 430 could actuate both the throttle lockout member 434' and the trigger 432. Thus, a catch 440' is provided to ensure that a dissimilar action (i.e., an enabling action) is required to be provided by the operator to unlock the throttle lockout member 434'.

FIG. 11 shows the catch 440' prior to the enabling action being performed. FIG. 12 illustrates the catch 440' after the enabling action has been performed. After the enabling action of FIG. 12 is performed, the throttle lockout member 434' could be depressed (similar to FIG. 6) to allow the throttle 432 to be actuated while the throttle lockout member 434' is in the actuated state. As shown in FIGS. 11 and 12, the catch 440' may include an operative member 442', a connecting portion 444' and a blocking portion 446'. The operative member 442' may be a slidable member that can be slid forward to actuate the catch 440' or move the catch 440' to initiate the enabling action (i.e., pushing the operative member 442' and thereby the entire catch 440' forward with the thumb or another finger of the operator). The connecting portion 444' may be a portion that encases at least part of a body of the throttle lockout member 434'. However, a portion of the connecting portion 444' may also be inside the throttle lockout member 434'. In this regard, the connecting portion 444' may define a first cavity 445 and a second cavity 447 between which a portion of the connecting portion 444' may extend. The first cavity 445 may receive a protrusion 449 from the body of the throttle lockout member 434'. The second cavity 447 may house a biasing element (e.g., spring 450'). Meanwhile, the blocking portion 446' may extend from a rear portion of the throttle lockout member connecting portion 444' to prevent movement of the throttle lockout member 434' to the actuated state unless the catch 440' is actuated (i.e., when the operative member 442' is pushed forward in the direction of arrow 460).

The biasing element (e.g., spring 450') may be provided to bias the connecting portion 444' (and thereby also the blocking portion 446') to be extended out of a rear end of the throttle lockout member 434'. Thus, other than at times when the operator presses the operative member 442' forward to execute the enabling action, the spring 450' may bias the blocking portion 446' to prevent the throttle lockout member 434' from being depressed. When the operative member 442' is pressed in the direction shown by arrow 460 (i.e., forward), the entire catch 440' moves in the direction of arrow 460 so that the blocking portion 446' is essentially withdrawn toward (and to some degree farther into) the throttle lockout member 434' so that downward movement to actuate the throttle lockout member 434' is not inhibited as shown in FIG. 12. The spring 450' is compressed to build up spring force to return the blocking portion 446' to its rest position as soon as the operator releases the operative member 442'. Moreover, in the example of FIGS. 11 and 12, the catch mechanism 440' defines an exposed top surface extending continuously from the operative member 442' to the blocking member 446'. Whereas the examples of FIGS. 4 and 5 provide that the connecting portion 444 is substantially inside the throttle lockout member 434, in the examples of FIGS. 11 and 12, only a small portion of the connecting portion 444' is within the throttle lockout member 434', while most of the connecting portion 444' actually surrounds a corresponding portion of the throttle lockout member 434'.

Example embodiments may therefore provide a relatively easy way to improve the safety and operability of the power tool (e.g., the chainsaw, blower, edger, trimmer and/or the like).

A hand-held power tool of an example embodiment may include an electric power source, an electric motor selectively coupled to the electric power source, a working assembly operably coupled to the electric motor to perform a working function responsive to actuation of the electric motor, and a control assembly operably coupled to the electric motor to provide selective control over actuation of the electric motor. The control assembly may be configured to provide the selective control based on performance of at least two dissimilar operator actions. The control assembly may include a sensing member and a throttle control member. The sensing member may be configured to be operable to an actuated state responsive to an enabling action comprising a first of the two dissimilar operator actions. The throttle control member may be configured to be repeatedly operable responsive to actuation of the throttle control member while the sensing member is in the actuated state. Actuation of the throttle control member may include a second of the two dissimilar operator actions.

The power tool (or control assembly) of some embodiments may include additional features that may be optionally added either alone or in combination with each other. For example, in some embodiments, In some examples, the control assembly may further include an interlock assembly operably coupled to the sensing member to prevent actuation of the sensing member until the enabling action is performed. In an example embodiment, the interlock assembly may be further configured to enable the sensing member to be held by the operator in the actuated state. In such an example, the throttle control member may be releasable and can be re-actuated without subsequent performance of the enabling action. In some cases, the sensing member may be disposed at a first portion of a handle of the equipment and the throttle control member may be disposed at a second portion of the handle. The first and second portions may be on opposite sides of the handle. The second of the two dissimilar actions may be associated with a grasping of the handle. The first of the two dissimilar actions may include performing the enabling action by using a finger to actuate the interlock assembly independent of a motion to grasp the handle. In an example embodiment, the interlock assembly may include a catch mechanism disposed at least partially within a portion of the sensing member. In some examples, the catch mechanism may include an operable member that is actuated by the finger to urge a blocking member of the catch mechanism out of a blocking position to enable the sensing member to be actuated. In some embodiments, the blocking member may be biased toward the blocking position by a biasing member. In some embodiments, the interlock assembly may include a key pad and switch member. The switch member may be contacted when the sensing member is in the actuated state. In some cases, the keypad may be spaced apart from the sensing member to be actuated by the finger to perform the enabling action. The sensing member may be enabled to shift to the actuated state based on performance of the enabling action. In an example embodiment, the control assembly may further include a timing element configured to enable the sensing member to be transitioned to the actuated state for a given period of time after performance of the enabling action. In some cases, the timing element is further configured to shift the sensing member out of the actuated state responsive to the sensing member not contacting the switch member.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A hand-held power tool comprising:
   an electric power source;
   an electric motor selectively coupled to the electric power source;
   a working assembly operably coupled to the electric motor to perform a working function responsive to actuation of the electric motor; and
   a control assembly operably coupled to the electric motor to provide selective control over actuation of the electric motor, the control assembly being configured to provide the selective control based on performance of at least two dissimilar operator actions,
   wherein the control assembly comprises:
      a sensing member configured to be operable to an actuated state responsive to an enabling action comprising a first of the two dissimilar operator actions;
      a throttle control member configured to be repeatedly operable responsive to actuation of the throttle control member while the sensing member is in the actuated state, wherein actuation of the throttle control member comprises a second of the two dissimilar operator actions; and
      a catch mechanism operably coupled to the sensing member to prevent actuation of the sensing member until the enabling action is performed.

2. The hand-held power tool of claim 1, wherein the catch mechanism is configured to enable the sensing member to be held by the operator in the actuated state, and wherein the throttle control member is releasable and can be re-actuated without subsequent performance of the enabling action.

3. The hand-held power tool of claim 2, wherein the sensing member is disposed at a first portion of a handle of the tool and the throttle control member is disposed at a second portion of the handle, the first and second portions being on opposite sides of the handle, the second of the two dissimilar actions being associated with a grasping of the handle, and wherein the first of the two dissimilar actions comprises performing the enabling action by using a finger to actuate the catch mechanism independent of a motion to grasp the handle.

4. The hand-held power tool of claim 1, wherein the catch mechanism is disposed at least partially within a portion of the sensing member.

5. The hand-held power tool of claim 4, wherein the catch mechanism extends around at least a portion of the sensing member.

6. The hand-held power tool of claim 4, wherein the catch mechanism comprises an operative member that is actuated by the finger to urge a blocking member of the catch mechanism out of a blocking position to enable the sensing member to be actuated.

7. The hand-held power tool of claim 6, wherein the operative member comprises a slidable member configured to slide forward to enable the sensing member to be actuated.

8. The hand-held power tool of claim 6, wherein the catch mechanism further comprises an exposed surface extending from the operative member to the blocking member.

9. The hand-held power tool of claim 6, wherein the blocking member is biased toward the blocking position by a biasing member.

10. The hand-held power tool of claim 9, wherein the catch mechanism further comprises at least one cavity inside which the biasing member is provided.

11. A control assembly for selectively controlling actuation of an electric motor that powers a working assembly of a hand-held power tool, the control assembly being configured to provide the selective control based on performance of at least two dissimilar operator actions, the control assembly comprising:
   a sensing member configured to be operable to an actuated state responsive to an enabling action comprising a first of the two dissimilar operator actions;
   a throttle control member configured to be repeatedly operable responsive to actuation of the throttle control member while the sensing member is in the actuated state, wherein actuation of the throttle control member comprises a second of the two dissimilar operator actions; and
   a catch mechanism operably coupled to the sensing member to prevent actuation of the sensing member until the enabling action is performed.

12. The control assembly of claim 11, wherein the catch mechanism is configured to enable the sensing member to be held by the operator in the actuated state, and wherein the throttle control member is releasable and can be re-actuated without subsequent performance of the enabling action.

13. The control assembly of claim 12, wherein the sensing member is disposed at a first portion of a handle of the tool and the throttle control member is disposed at a second portion of the handle, the first and second portions being on opposite sides of the handle, the second of the two dissimilar actions being associated with a grasping of the handle, and wherein the first of the two dissimilar actions comprises performing the enabling action by using a finger to actuate the catch mechanism independent of a motion to grasp the handle.

14. The control assembly of claim 11, wherein the catch mechanism is disposed at least partially within a portion of the sensing member.

15. The control assembly of claim 14, wherein the catch mechanism extends around at least a portion of the sensing member.

16. The control assembly of claim 14, wherein the catch mechanism comprises an operative member that is actuated by the finger to urge a blocking member of the catch mechanism out of a blocking position to enable the sensing member to be actuated.

17. The control assembly of claim 16, wherein the operative member comprises a slidable member configured to slide forward to enable the sensing member to be actuated.

18. The control assembly of claim 16, wherein the catch mechanism further comprises an exposed surface extending from the operative member to the blocking member.

19. The control assembly of claim 16, wherein the blocking member is biased toward the blocking position by a biasing member.

20. The control assembly of claim 19, wherein the catch mechanism further comprises at least one cavity inside which the biasing member is provided.

* * * * *